(12) United States Patent
Chun et al.

(10) Patent No.: US 11,556,210 B2
(45) Date of Patent: Jan. 17, 2023

(54) DISPLAY DRIVING DEVICE IN WHICH AUXILIARY SIGNAL IS SUPPLIED TO PANEL

(71) Applicant: LX Semicon Co., Ltd., Daejeon (KR)

(72) Inventors: Chan Ho Chun, Daejeon (KR); Dong Min Won, Daejeon (KR); Ho Jin Kang, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 0 days.

(21) Appl. No.: 17/510,270

(22) Filed: Oct. 25, 2021

(65) Prior Publication Data

US 2022/0147220 A1    May 12, 2022

(30) Foreign Application Priority Data

Nov. 6, 2020    (KR) .......................... 10-2020-0147263

(51) Int. Cl.
*G06F 3/041*    (2006.01)
*G06F 3/044*    (2006.01)

(52) U.S. Cl.
CPC .......... *G06F 3/04184* (2019.05); *G06F 3/044* (2013.01); *G06F 3/0412* (2013.01)

(58) Field of Classification Search
CPC ..... G06F 3/04184; G06F 3/0412; G06F 3/044
See application file for complete search history.

(56) References Cited

U.S. PATENT DOCUMENTS

| | | | |
|---|---|---|---|
| 9,007,343 B1 | 4/2015 | Ludden | |
| 9,552,089 B2 | 1/2017 | Lukanc et al. | |
| 10,001,859 B2 | 6/2018 | Park et al. | |
| 10,275,089 B2 | 4/2019 | Kim et al. | |
| 2016/0019827 A1* | 1/2016 | Lee | G06F 3/04184 345/204 |
| 2016/0026312 A1* | 1/2016 | Park | G06F 3/04184 345/174 |
| 2017/0024077 A1* | 1/2017 | Lin | G06F 3/04184 |
| 2017/0090673 A1* | 3/2017 | Kim | G06F 3/0418 |
| 2018/0004343 A1* | 1/2018 | Shin | G02F 1/13338 |
| 2018/0095597 A1 | 4/2018 | Kwon et al. | |
| 2019/0204944 A1* | 7/2019 | Jun | G06F 3/0412 |
| 2019/0384452 A1* | 12/2019 | Kang | G06F 3/04184 |

FOREIGN PATENT DOCUMENTS

| | | |
|---|---|---|
| CN | 101866228 B | 10/2013 |
| KR | 10-2017-0039053 A | 4/2017 |
| KR | 10-2018-0036831 A | 4/2018 |

\* cited by examiner

*Primary Examiner* — Hong Zhou
(74) *Attorney, Agent, or Firm* — Fenwick & West LLP

(57) ABSTRACT

The present disclosure relates to a technology for supplying an auxiliary signal to a panel, which allows maximizing an effect of removing parasitic capacitances by correcting an auxiliary signal such that characteristics of the auxiliary signal conform with those of a touch driving signal.

15 Claims, 8 Drawing Sheets

DISPLAY DRIVING DEVICE IN WHICH AUXILIARY SIGNAL IS SUPPLIED TO PANEL

CROSS REFERENCE TO RELATED APPLICATION

This application claims priority from Republic of Korea Patent Application No. 10-2020-0147263, filed on Nov. 6, 2020, which is hereby incorporated by reference in its entirety.

BACKGROUND

1. Field of Technology

The present disclosure relates to a technology for supplying an auxiliary signal in order to remove parasitic capacitance in a panel.

2. Description of the Prior Art

A screen of an electronic apparatus can be where an image is displayed as well as where an input is received. In order that a screen of an electronic apparatus receives an input, a touch sensing technology for perceiving a touch or proximity of an external object is used. A touch panel inside such an electronic apparatus is disposed in the same position as that of a display panel in a plane view and this allows a user to input a user operation signal into the touch panel while the user looks at images on the display panel. Such a method of generating user operation signals is remarkably intuitive for users compared with previous other user operation signal input methods, such as a mouse input method or a keyboard input method.

Recently, an in-cell structure, in which touch sensors comprised in a touch panel are embedded in a pixel array of a display panel, is being proposed. In the in-cell structure, touch sensors may be mounted on a display panel without increasing the thickness of the display panel. The touch sensors may identify a touch or proximity of an external object by sensing a change of capacitance. However, there could be generated parasitic capacitance due to a coupling between a touch sensor and its neighbor electrode. The parasitic capacitance may influence the change of capacitance sensed by the touch sensor and such an influence may cause a misidentification of a touch or proximity of an external object. Therefore, when a touch sensor operates, parasitic capacitance needs to be removed.

In order to remove parasitic capacitance, an auxiliary signal may be used. An auxiliary signal may prevent parasitic capacitance from being generated by having the same characteristics, for example phase and amplitude, as those of a touch driving signal. However, while an auxiliary signal is transmitted through a line, there could be a delay due to resistance elements and capacitance elements and such a delay may cause a deformation or a distortion of characteristics of an auxiliary signal. Here, a delay due to resistance elements and capacitance elements may be referred to as an RC delay. Since a delay may vary depending on the length of a line through which an auxiliary signal travels, distortions of auxiliary signals applied to surrounding electrodes may be different from each other. For this reason, even when an auxiliary signal identical to a touch driving signal is supplied to a panel, auxiliary signals arriving at pixels will have different phases or amplitudes, and thus, parasitic capacitance may not be removed.

SUMMARY OF THE INVENTION

In this background, an aspect of the present disclosure is to provide a technology to correct a transmission distortion of an auxiliary signal transmitted through a gate line and a data line.

Another aspect of the present disclosure is to provide a technology to correct an auxiliary signal distorted differently by each gate line.

To this end, in an aspect, the present disclosure provides a display driving device comprising: a gate driving circuit to transmit to a gate line a gate auxiliary signal having a first phase difference in comparison with a touch driving signal transmitted to a touch electrode; and a data driving circuit to transmit to a data line a data auxiliary signal having a second phase difference in comparison with the touch driving signal, wherein a phase difference between the touch driving signal and the gate auxiliary signal is less than the first phase difference in a region where the gate line and the touch electrode overlap and a phase difference between the touch driving signal and the data auxiliary signal is less than the second phase difference in a region where the data line and the touch electrode overlap.

In another aspect, the present disclosure provides a display driving device comprising: a gate driving circuit to transmit a gate auxiliary signal to a gate line; and an auxiliary signal generating circuit to correct a phase of the gate auxiliary signal such that a phase difference between a touch driving signal transmitted to a touch electrode and the gate auxiliary signal decreases in a region where the gate line and the touch electrode overlap.

When a touch sensing circuit drives a first touch electrode by a first touch driving signal and a second touch electrode by a second touch driving signal, the auxiliary signal generating circuit may generate a first gate auxiliary signal in accordance with the first touch driving signal and generate a second gate auxiliary signal in accordance with the second touch driving signal, wherein the first gate auxiliary signal and the second gate auxiliary signal may respectively have phases different from each other.

In still another aspect, the present disclosure provides a display driving device comprising: a data driving circuit to transmit a data auxiliary signal to a data line; and an auxiliary signal generating circuit to correct a phase of the data auxiliary signal such that a phase difference between a touch driving signal transmitted to a touch electrode and the data auxiliary signal decreases in a region where the data line and the touch electrode overlap.

As described above, according to the present disclosure, it is possible to compensate for an effect of removing parasitic capacitances, which decreases due to distortions of characteristics of an auxiliary signal.

In addition, according to the present disclosure, it is possible to prevent misidentification of a touch or proximity of an external object and to increase the sensitivity for touch sensing by removing parasitic capacitances.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
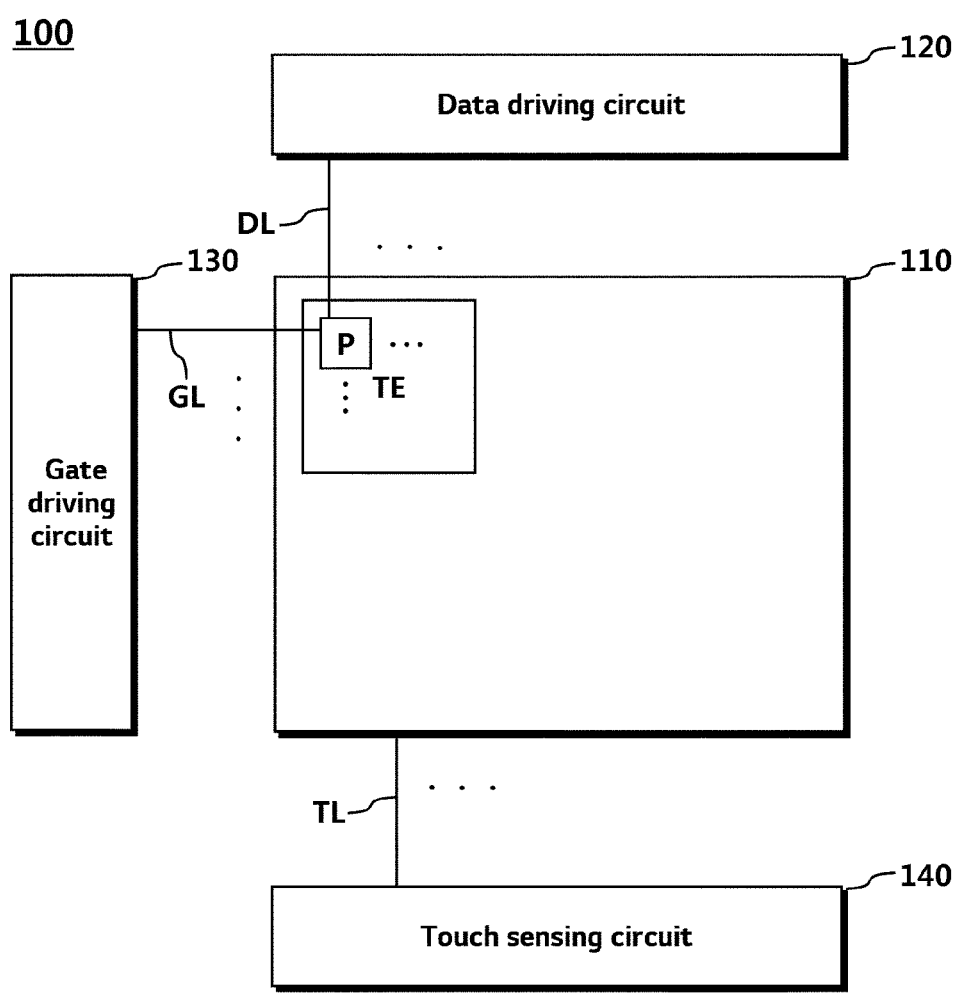
FIG. 1 is a configuration diagram of a display device according to an embodiment.

FIG. 1 is a configuration diagram of a display device according to an embodiment.

Referring to FIG. 1, a display device 100 may comprise a panel 110, a data driving circuit 120, a gate driving circuit 130, and a touch sensing circuit 140.

The panel 110 may comprise a plurality of data lines DL which are connected with the data driving circuit 120 and a plurality of gate lines GL which are connected with the gate driving circuit 130. In addition, the panel 110 may also comprise a plurality of pixels P corresponding to intersection points of the plurality of data lines DL and the plurality of gate lines GL.

Each pixel P may comprise a transistor in which a first electrode (for example, a source electrode or a drain electrode) is connected with a data line DL, a gate electrode is connected with a gate line GL, and a second electrode (for example, a drain electrode or a source electrode) is connected with a display electrode.

The panel 110 may also comprise a plurality of touch electrodes TE disposed to be spaced from each other. In an area where a touch electrode TE is located, a pixel P or a plurality of pixels P may be disposed.

The panel 110 may comprise a display panel and a touch panel (TSP: touch screen panel) and the display panel and the touch panel may share some components. For example, a plurality of touch electrodes TE may be a component of the display panel (for example, common electrodes to which common voltages are applied) as well as a component of the touch panel (for example, touch electrodes to sense touches). Such a panel 110 may be referred to as an integrated panel in terms that the display panel and the touch panel share some components, but the present disclosure is not limited thereto. In addition, an in-cell type panel, in which the display panel and the touch panel share some components, is known, but this is only an example of the above-described panel 110, and a panel, to which the present disclosure is applied, is not limited to an in-cell type panel.

The data driving circuit 120 may supply a data signal to a data line DL in order to display an image in each pixel P of the panel 110.

Such a data driving circuit 120 may be connected to a bonding pad of the panel 110 in a tape automated bonding (TAB) method or a chip-on-glass (COG) method, directly formed on the panel 110, or integrated on the panel 110 depending on cases. In addition, the data driving circuit 120 may be formed in a chip-on-film (COF) method.

The gate driving circuit 130 may sequentially supply scan signals to gate lines in order to turn on or off transistors located in respective pixels P.

The gate driving circuit 130, depending on driving methods, may be disposed on one side of the panel 110 as shown in FIG. 1, or divided into two to be disposed on both sides of the panel 110.

The gate driving circuit 130 may be connected to a bonding pad of the panel 110 in a tape automated bonding (TAB) method or a chip-on-glass (COG) method, implemented in a gate in panel (GIP) type to be directly formed on the panel 110, or integrated on the panel 110 depending on cases. In addition, the gate driving circuit 130 may be formed in a chip-on-film (COF) method.

The touch sensing circuit 140 may transmit a driving signal to a touch electrode connected with a touch sensing line TL.

The touch sensing circuit 140 may be disposed outside the data driving circuit 120 and the gate driving circuit as a component independent of the data driving circuit 120 and the gate driving circuit 130 as shown in FIG. 1. However, depending on implementing methods, the touch sensing circuit 130 may also be implemented as an internal component of an independent driver integrated circuit comprising at least one of the data driving circuit 120 and the gate driving circuit 130 or may be implemented as an internal component of either the data driving circuit 120 or the gate driving circuit 130.

Accordingly, an action that the touch sensing circuit 140 supplies driving signals to the whole or some of the plurality of touch electrodes TE may be considered as an action that an independent driver integrated circuit comprising the touch sensing circuit 140 supplies driving signals to the whole or some of the plurality of touch electrodes TE. Otherwise, depending on designing methods, it may be considered as an action that the data driving circuit 120 or the gate driving circuit 130 comprising the touch sensing circuit 140 supplies driving signals to the whole or some of the plurality of touch electrodes TE.

As described above, a touch sensing circuit 140 may be an independent component or an internal component disposed inside or outside another component without being restricted by an implementing or designing method as long as it performs the same function as that described in the present specification.

In addition, even though the display device 100 comprises one touch sensing circuit 140 in FIG. 1, a display device 100 may comprise two or more touch sensing circuits 140.

In order that a touch sensing circuit 140 supplies driving signals to the whole or some of the plurality of touch electrodes TE, touch sensing lines TL respectively connected with the plurality of touch electrodes TE, are required. Accordingly, touch sensing lines TL, respectively connected with the plurality of touch electrodes TE and transmitting driving signals, may be disposed on the panel 110 in a first direction (for example: a longitudinal direction) or in a second direction (for example: a transversal direction).

The display device 100 may adopt a capacitive touch mode in which the proximity or a touch of an object is sensed by detecting a change of capacitance by touch electrodes TE.

The capacitive touch mode may be divided, for example, into a mutual capacitive touch mode and a self-capacitive touch mode.

According to the mutual capacitive touch mode, which is a type of the capacitive touch mode, a driving signal is supplied to one touch electrode (Tx electrode) and another touch electrode (Rx electrode) mutually coupled with the one Tx electrode is sensed. In the mutual capacitive touch mode, values sensed in an Rx electrode vary depending on the proximity or a touch of an object, such as a finger, a pen, or the like, and whether or not there is a touch or coordinates for a touch may be detected using such values sensed in an Rx electrode.

According to the self-capacitive touch mode, which is another type of capacitive touch mode, a driving signal is supplied to one touch electrode TE and this touch electrode TE is sensed. In the self-capacitive touch mode, values sensed in a touch electrode TE vary depending on the proximity or a touch of an object, such as a finger, a pen, or the like, and whether or not there is a touch or coordinates for a touch may be detected using such sensed values. In the self-capacitive touch mode, a touch electrode TE to which a driving signal is supplied is the same as a touch electrode TE to be sensed. That is, there is no distinction between a Tx electrode and an Rx electrode.

The display device 100 may adopt one of the two types of the capacitive touch modes (the mutual capacitive mode and the self-capacitive mode). However, in this specification, the case in which the self-capacitive mode is adopted will be described for the convenience of description.

Meanwhile, the display device 100 may distinguish a display time section from a touch time section to drive the touch electrodes TE. For example, the touch sensing circuit 140 of the display device 100 may not transmit touch driving signals to the whole or some of the touch electrodes TE in a time section where a data signal is supplied.

However, the display device 100 may not distinguish a display time section from a touch time section to drive the touch electrodes TE. For example, the touch sending circuit 140 of the display device 100 may transmit driving signals to the whole or some of the touch electrodes TE in a section where a data signal is supplied.

Figure 2:
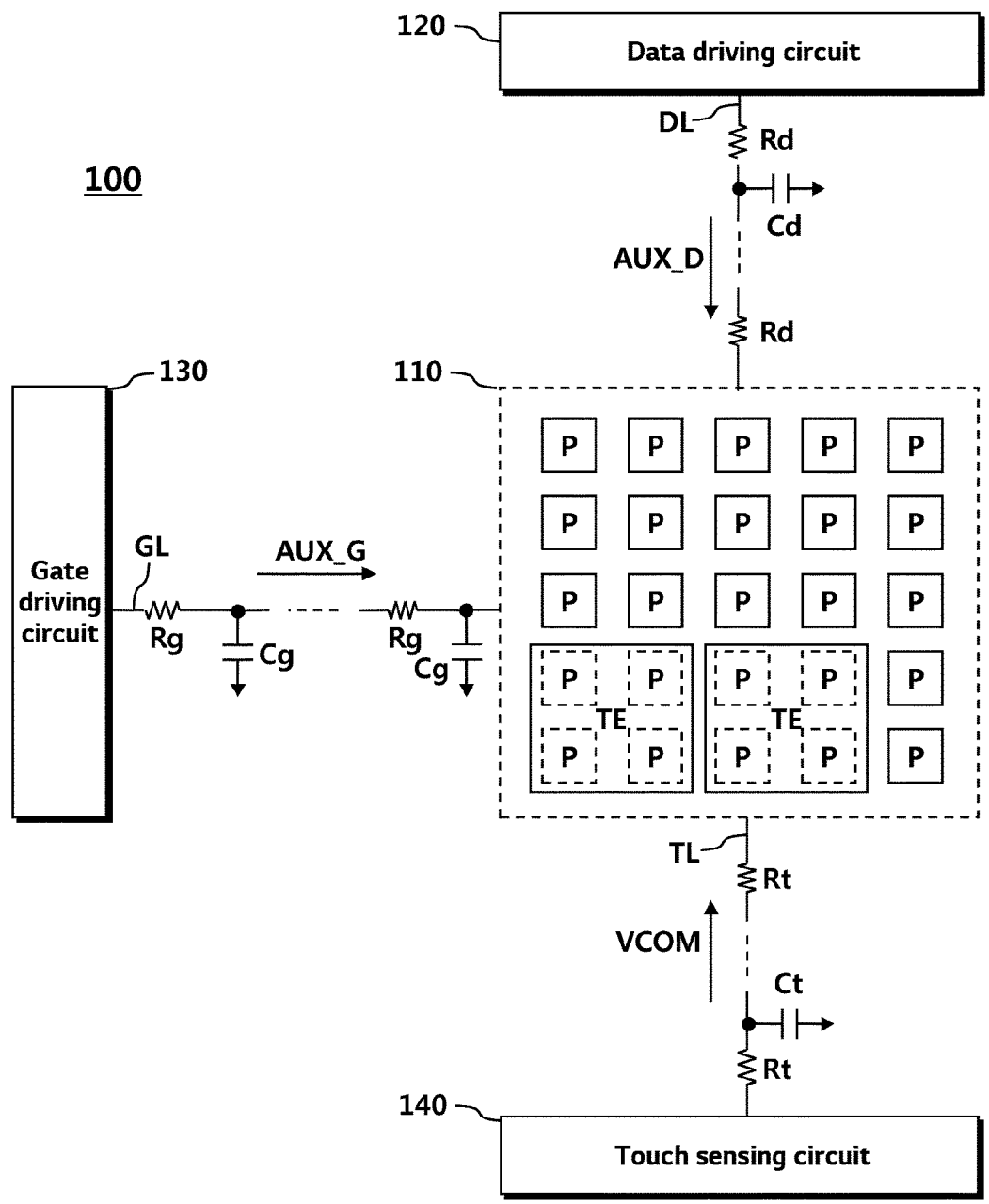
FIG. 2 is a diagram illustrating RC delays in a gate line, a data line, and a touch sensing line according to an embodiment.

FIG. 2 is a diagram illustrating RC delays in a gate line, a data line, and a touch sensing line according to an embodiment.

Referring to FIG. 2, there could be resistance elements and capacitance elements in a gate line GL, a data line DL, and a touch sensing line TL.

A resistance element may be generated due to a wire resistance in each line and a capacitance element may be generated due to a coupling between each line and another adjacent wire or between electrodes. In FIG. 2, a resistance element may be represented by a resistance and a capacitance element may be represented by a capacitor. Accordingly, a data line DL connected between the data driving circuit 120 and the panel 110 may include a series of resistances Rd and capacitors Cd, a gate line GL connected between the gate driving circuit 130 and the panel 110 may include a series of resistances Rg and capacitors Cg, and a touch sensing line TL connected between the touch sensing circuit 140 and the panel 110 may include a series of resistances Rt and capacitors Ct.

Resistance elements and capacitance elements in each line may delay a signal passing through the line. A delay due to resistance elements and capacitance elements may be referred to as an RC delay. As a line becomes longer, the line may include more resistance elements and capacitance elements and this leads to a long delay. The RC delay may deform or distort a signal. Generally, the RC delay may make a phase of a signal lead or lag in comparison with an original phase of the signal.

For example, through a gate line GL, a gate auxiliary signal AUX_G may be transmitted to a pixel together with a touch driving signal. A phase of the gate auxiliary signal AUX_G may be distorted by a delay due to resistances Rg and capacitors Cg of the gate line GL. Through a data line DL, a data auxiliary signal AUX_D may be transmitted to a pixel together with a touch driving signal. A phase of the data auxiliary signal AUX_D may be distorted by a delay due to resistances Rd and capacitors Gd of the data line DL. Here, a common electrode comprised in a pixel may function as a touch electrode TE. Therefore, a signal 'VCOM' transmitted to a common electrode in a touch time section may be considered as a touch driving signal.

In addition, resistance elements in each line may reduce an amplitude of a signal passing through the line. Accordingly, an amplitude of a signal which has passed through the line may be narrower than an original amplitude of the signal. That is because an energy loss occurring when a signal passes through a transmission line may reduce the intensity of the signal.

For example, the intensity of the data auxiliary signal AUX_D may be reduced by the resistances Rd of the data line DL. An amplitude of the data auxiliary signal AUX_D when the data auxiliary signal AUX_D arrives at the panel 110 may be narrower than an initial amplitude thereof when it has started from the data driving circuit 120. The intensity of the gate auxiliary signal AUX_G may also be reduced by the resistances Rg of the gate line GL. An amplitude of the gate auxiliary signal AUX_G, when the gate auxiliary signal AUX_G arrives at the panel 110, may be narrower than an initial amplitude thereof, when it has started from the gate driving circuit 130.

Even though FIG. 2 shows only one gate line GL, one data line DL, and one touch sensing line in order to explain an RC delay, gate lines GL and data lines DL may be connected respectively with a plurality of pixels P and touch sensing lines TL may be connected respectively with a plurality of touch electrodes TE.

Meanwhile, in the panel 110, a display panel and a touch panel may be disposed in the same position and the display panel and the touch panel may share some components. Therefore, a touch electrode TE of the touch panel and a plurality of pixels P may overlap each other.

Figure 3:
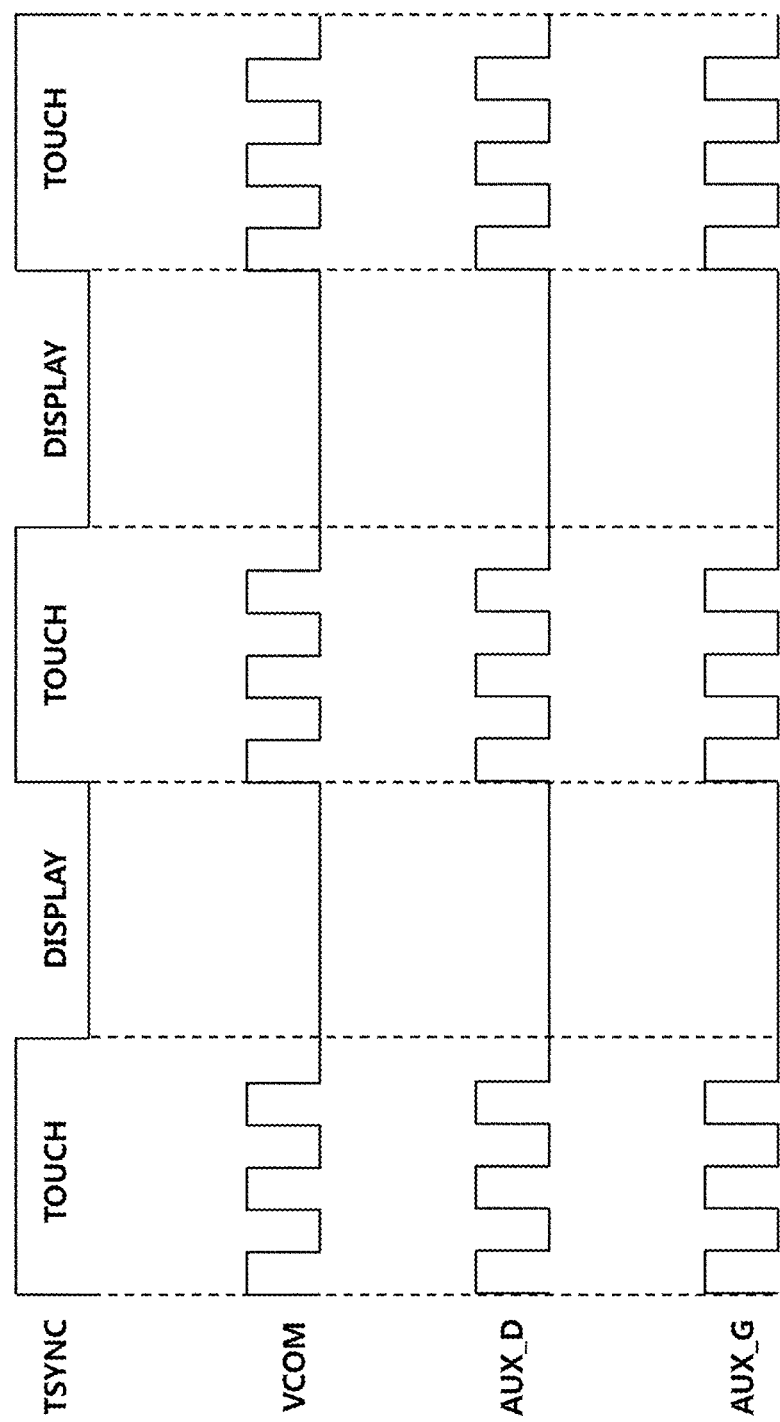
FIG. 3 is a diagram illustrating a touch driving signal, a gate auxiliary signal, and a data auxiliary signal.

FIG. 3 is a diagram illustrating a touch driving signal, a gate auxiliary signal, and a data auxiliary signal.

Referring to FIG. 3, a touch driving signal VCOM, a gate auxiliary signal AUX_G, and a data auxiliary signal AUX_D with the same characteristics may be supplied to the panel at the same timing.

In a structure where a touch panel is embedded in a display panel or a touch panel and a display panel share some components, for example, an in-cell structure, a display drive and a touch drive may be performed in a time division way. In other words, the display device may perform a display drive and a touch drive in different time sections.

For example, the display device may generate a time division signal TSYNC to determine a touch time section TOUCH where a touch drive is performed and a display time section DISPLAY where a display drive is performed. The touch sensing circuit may operate by synchronizing with the time division signal TSYNC and output a touch driving signal VCOM only in touch time sections TOUCH to drive a touch electrode.

At the same time, a data auxiliary signal AUX_D and a gate auxiliary signal AUX_G may be supplied to the panel in order to remove the influence of parasitic capacitance around the touch electrode. The data auxiliary signal AUX_D and the gate auxiliary signal AUX_G may also be outputted to a pixel only in touch time sections TOUCH indicated by the time division signal TSYNC and have the same amplitudes and phases as that of the touch driving signal VCOM.

Ideally, the touch driving signal VCOM, the gate auxiliary signal AUX_G, and the data auxiliary signal AUX_D are supposed to have the same amplitudes and phases when they are supplied to the panel as shown in FIG. 3. However, due to a distortion in transmission, phases and/or amplitudes of the gate auxiliary signal AUX_G and the data auxiliary signal AUX_D may be deformed. Generally, the phases may be distorted (lead or lag) and the amplitudes may narrow. Accordingly, if the gate auxiliary signal AUX_G and the data auxiliary signal AUX_D are outputted to the panel after having corrected such distortions, the phases and amplitudes of the gate auxiliary signal AUX_G and the data auxiliary signal AUX_D when they arrive at the panel may be the same as the phase and amplitude of the touch driving signal VCOM.

Figure 4:
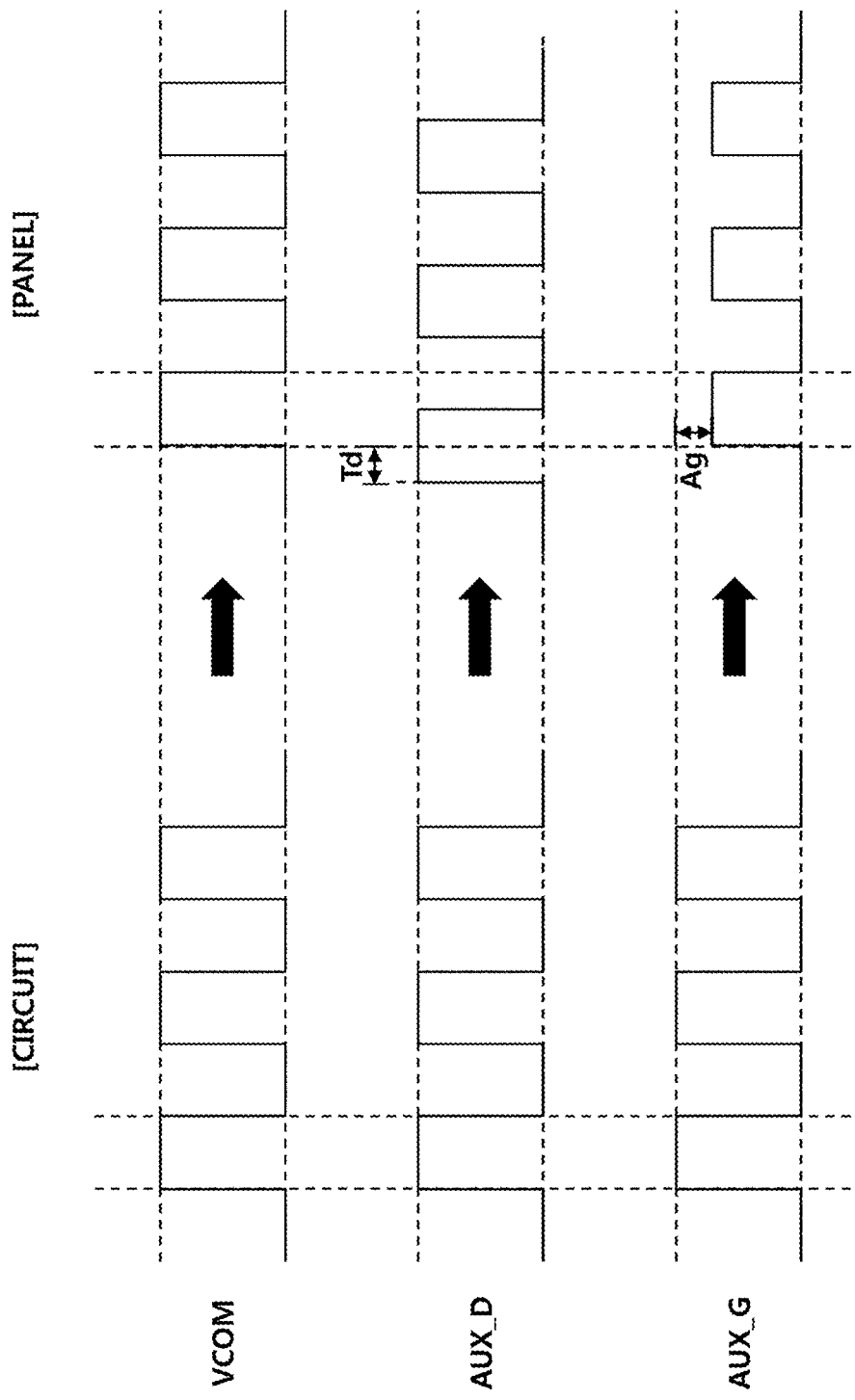
FIG. 4 is a diagram illustrating distortions of a phase or an amplitude of a data auxiliary signal and a gate auxiliary signal.

FIG. 4 is a diagram illustrating distortions of a phase or an amplitude of a data auxiliary signal and a gate auxiliary signal.

Referring to FIG. 4, when the data auxiliary signal AUX_D and the gate auxiliary signal AUX_G arrive at the panel, their phases and amplitudes may be distorted.

For example, when the touch driving signal VCOM arrives at the panel after being outputted from the touch sensing circuit, the data auxiliary signal AUX_D and the gate auxiliary signal AUX_G, arriving at the panel, are supposed to have the same phases and amplitudes as the phase and amplitude of the touch driving signal VCOM. However, when the data auxiliary signal AUX_D is transmitted from the data driving circuit to the panel, the phase of the data auxiliary signal AUX_D may lead by Td due to an RC delay of the data line DL, or, the amplitude of the data auxiliary signal AUX_D may narrow due to an energy loss by resistance elements of the data line DL. When the gate auxiliary signal AUX_G is transmitted from the gate driving circuit to the panel, the amplitude of the gate auxiliary signal AUX_G may narrow by Ag due to an energy loss by resistance elements of the gate line GL, or, the phase of the gate auxiliary signal AUX_G may lag due to an RC delay of the gate line GL.

As described above, the data auxiliary signal AUX_D has the same phase and amplitude as the phase and amplitude of the touch driving signal VCOM when starting from the data driving circuit, however, it has a phase different from the phase of the touch driving signal VCOM when arriving at the panel. In addition, the gate auxiliary signal AUX_G has the same phase and amplitude as the phase and amplitude of the touch driving signal VCOM when staring from the gate driving circuit, however, it has an amplitude different from the amplitude of the touch driving signal VCOM when arriving at the panel. The data auxiliary signal AUX_D and the gate auxiliary signal AUX_G having a phase or an amplitude different from those of the touch driving signal VCOM may reduce an initially intended effect of removing parasitic capacitance.

Figure 5:
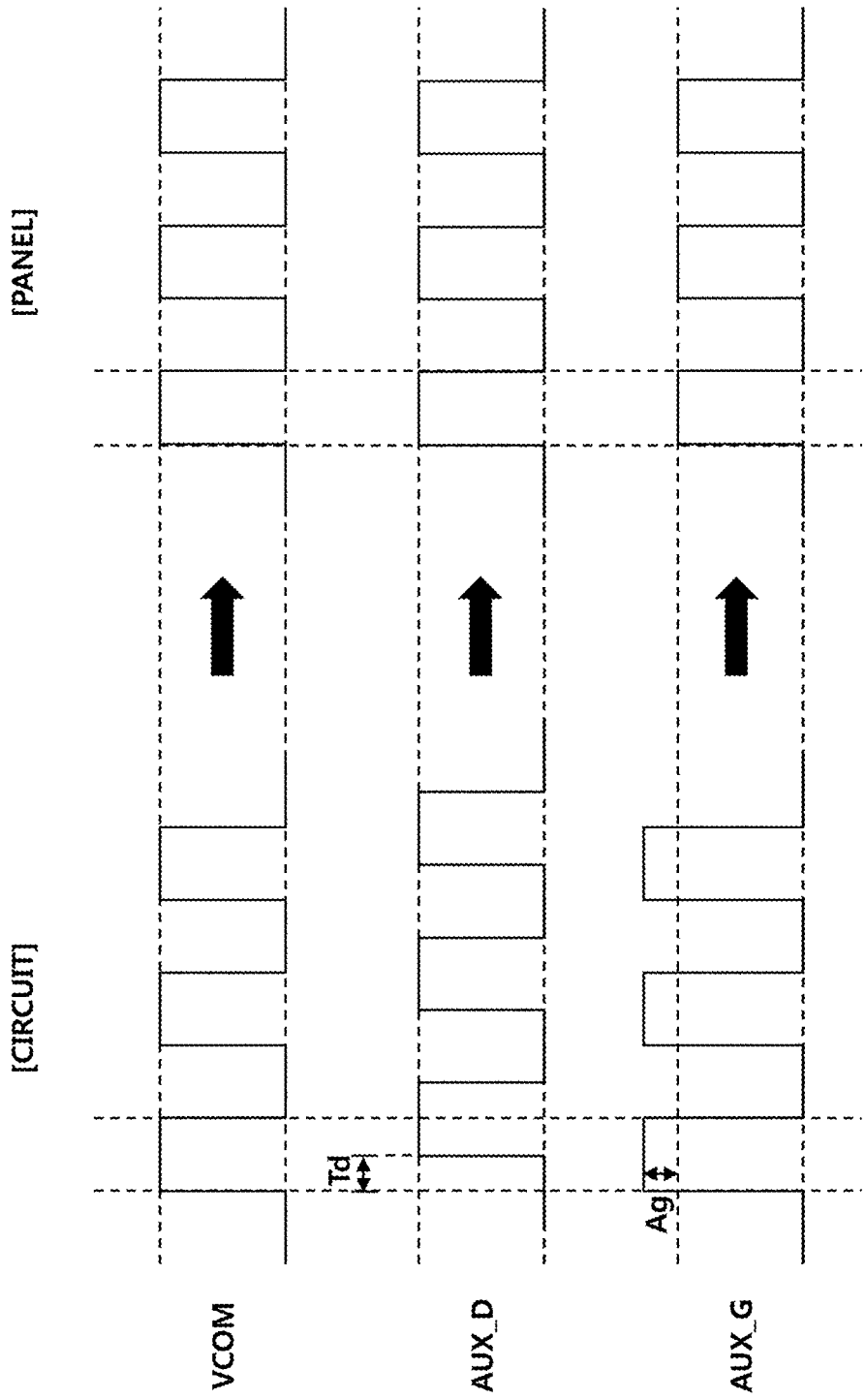
FIG. 5 is a diagram illustrating corrections to distortions of a phase or an amplitude of a data auxiliary signal and a gate auxiliary signal.

FIG. 5 is a diagram illustrating corrections to distortions of a phase or an amplitude of a data auxiliary signal and a gate auxiliary signal.

Referring to FIG. 5, the data auxiliary signal AUX_D and the gate auxiliary signal AUX_G may be corrected in their phases and amplitudes before being transmitted in consideration of the distortion in transmission.

For example, when the data auxiliary signal AUX_D arrives at the panel, its phase may lead by Td due to the RC delay of the data line DL. Here, when the data auxiliary signal AUX_D is generated, its phase to lead by Td may be considered. Therefore, the data auxiliary signal AUX_D may be corrected such that its phase lags by Td (see [CIRCUIT] of AUX_D in FIG. 5). When the gate auxiliary signal AUX_G arrives at the panel, its amplitude may narrow by Ag due to an energy loss by the resistance elements of the gate line GL. Here, when the gate auxiliary signal AUX_G is generated, its amplitude to narrow by Ag may be considered. Therefore, the gate auxiliary signal AUX-G may be corrected such that its amplitude is higher by Ag (see [CIRCUIT] of AUX_G in FIG. 5).

As such, the data auxiliary signal AUX_D and the gate auxiliary signal AUX_G may be corrected such that they may have the same phases and amplitudes as those of the touch driving signal VCOM in the panel. If a distortion degree of the phase of the data auxiliary signal AUX_D, that is, a degree, in which the phase thereof leads, can be measured, the initial data auxiliary signal AUX_D may be corrected such that its phase lags. If a distortion degree of the amplitude of the gate auxiliary signal AUX_G, that is, a degree, in which the amplitude thereof narrows, can be measured, the initial gate auxiliary signal AUX_G may be corrected such that its amplitude is broadened. In this way, the data auxiliary signal AUX_D and the gate auxiliary signal AUX_G may have the same phases and amplitudes as those of the touch driving signal VCOM at the panel, thereby maximizing the effect of removing parasitic capacitance.

Figure 6:
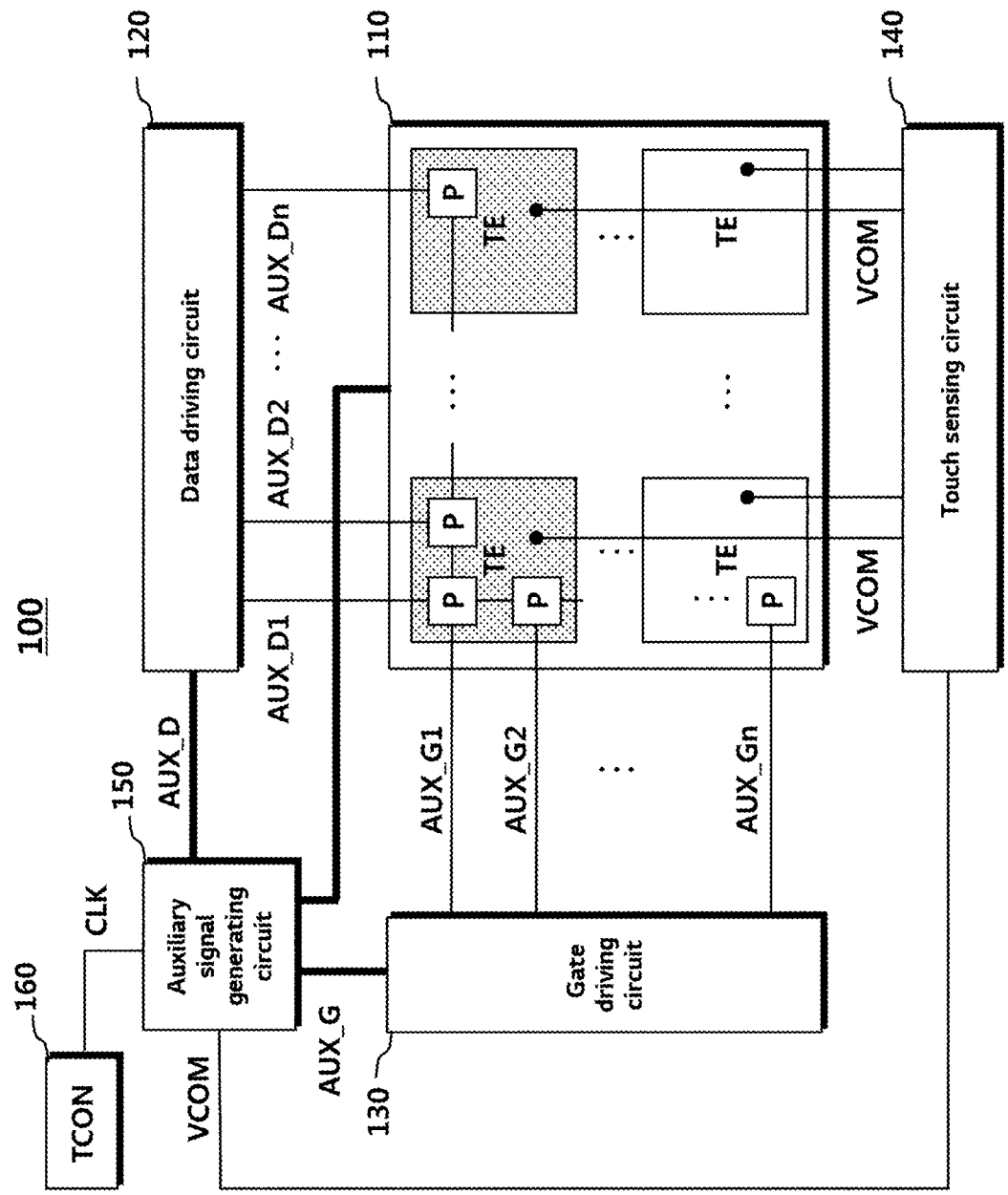
FIG. 6 is an example of a display device in which auxiliary signals are supplied to a panel according to an embodiment.

FIG. 6 is an example of a display device in which auxiliary signals are supplied to a panel according to an embodiment.

Referring to FIG. 6, the display device 100 may further comprise an auxiliary signal generating circuit 150 and a timing controller (TCON) 160. A plurality of touch electrodes TE may be disposed in a horizontal direction in the panel to form a touch electrode line and a plurality of such touch electrode lines are disposed in the panel. The touch electrodes TE may be driven by the touch sensing circuit 140 by line. FIG. 6 shows that a first touch electrode line is being driven at this moment and touch electrodes TE in the first touch electrode line are shaded.

The auxiliary signal generating circuit 150 may generate a gate auxiliary signal AUX_G or receive a gate auxiliary signal from another circuit. Hereinafter, a case when the auxiliary signal generating circuit 150 generates a gate auxiliary signal AUX_G will be described.

The auxiliary signal generating circuit 150 may transmit a gate auxiliary signal AUX_G to the gate driving circuit 130. The gate auxiliary signal AUX_G may comprise a series of gate auxiliary signals AUX_G1, AUX-G2, ~AUX_Gn respectively corresponding to a plurality of gate lines. The gate driving circuit 130 may transmit a series of gate auxiliary signals AUX_G1, AUX-G2, ~AUX_Gn respectively through the plurality of gate lines to the pixels Pin the panel 110.

The auxiliary signal generating circuit 150 may measure the distortion of the gate auxiliary signal AUX_G in the panel 110 and correct the distortion such that the gate auxiliary signal AUX_G is identical to a touch driving signal VCOM.

Specifically, there may be a plurality of gate lines, including a first gate line and a second gate line. The auxiliary signal generating circuit 150 may separately measure a first distortion of a first gate auxiliary signal AUX_G1 transmitted through the first gate line and a second distortion of a second gate auxiliary signal AUX_G2 transmitted through the second gate line. The auxiliary signal generating circuit 150 may correct the first distortion and the second distortion so that the first gate auxiliary signal AUX_G1 and the second gate auxiliary signal AUX_G2 are identical to the touch driving signal VCOM.

For example, the auxiliary signal generating circuit 150 may measure distortions of a phase or an amplitude of the first gate auxiliary signal AUX_G1 supplied to a first pixel through the first gate line. In a case when an amplitude of the first gate auxiliary signal AUX_G1 decreases, the auxiliary signal generating circuit 150 may correct the first gate auxiliary signal AUX_G1 so that the amplitude of the first gate auxiliary signal AUX_G1 may increase by a size of the decrease of the amplitude. The auxiliary signal generating circuit 150 may transmit the first gate auxiliary signal AUX_G1 having a corrected amplitude to the gate driving circuit 130 and the gate driving circuit 130 may supply the first gate auxiliary signal AUX_G1 to the first pixel.

The auxiliary signal generating circuit 150 may also measure distortions of a phase or an amplitude of the second gate auxiliary signal AUX_G2 supplied to a second pixel through the second gate line. In a case when a phase of the second gate auxiliary signal AUX_G2 leads, the auxiliary signal generating circuit 150 may correct the second gate auxiliary signal AUX_G2 so that the phase of the second gate auxiliary signal AUX_G2 may lag by an amount of time that the phase leads. The auxiliary signal generating circuit 150 may transmit the second gate auxiliary signal AUX_G2 having a corrected phase to the gate driving circuit 130 and the gate driving circuit 130 may supply the second gate auxiliary signal AUX_G2 to the second pixel.

In this case, a situation where the first gate auxiliary signal AUX_G1 and the second gate auxiliary signal AUX_G2 have different distortions and thus different corrections are performed, is described. However, the present disclosure is not limited thereto. It is possible to apply the same correction to the first gate auxiliary signal AUX_G1 and the second gate auxiliary signal AUX_G2. In the above-described example, the correction to the amplitude is applied to the first gate auxiliary signal AUX_G1 and the correction to the phase is applied to the second gate auxiliary signal AUX_G2. However, it is possible to apply the same correction to both the first gate auxiliary signal AUX_G1 and the second gate auxiliary signal AUX_G2. Specifically, in a case when the first distortion of the first gate auxiliary signal AUX_G1 and the second distortion of the second gate auxiliary signal AUX_G2 are different, it is possible to perform corrections based on any one of the distortions of the first gate auxiliary signal AUX_G1 and the second gate auxiliary signal AUX_G2. By expanding this concept, it is also possible to apply the same correction based on one distortion to a series of gate auxiliary signals AUX_G1, AUX_G2, ~AUX_Gn.

Furthermore, it is also possible to apply the same correction to some of a series of gate auxiliary signals AUX_G1, AUX_G2, ~AUX_Gn. In other words, a series of gate auxiliary signals AUX_G1, AUX_G2, ~AUX_Gn may be divided into a plurality of groups and a same correction may be applied to gate auxiliary signals belonging to each group. For example, a series of gate auxiliary signals AUX_G1, AUX_G2, ~AUX_Gn may be divided into a first group and a second group. The same correction in a first method may be applied to gate auxiliary signals in the first group and another same correction in a second method may be applied to gate auxiliary signals in the second group. The gate auxiliary signals in each group corrected in each method may be transmitted to the panel together with a touch driving signal.

The auxiliary signal generating circuit 150 may use a touch driving signal VCOM for generating a gate auxiliary signal AUX_G. The reason is that a gate auxiliary signal AUX_G needs to have the same characteristics, that is, the same phase and the same amplitude as those of a touch driving signal VCOM in principle. The auxiliary signal generating circuit 150 may receive a touch driving signal VCOM from the touch sensing circuit 140 and generate a gate auxiliary signal AUX_G by reflecting distortions of the gate auxiliary signal AUX_G measured in the panel 110 in the touch driving signal VCOM.

For example, in a case when a correction to increase a decreased amplitude of a first gate auxiliary signal AUX_G1 is required, the auxiliary signal generating circuit 150 may increase an amplitude of a touch driving signal VCOM and use the touch driving signal VCOM as the first gate auxiliary signal AUX_G1. Otherwise, in a case when a correction to lag a leading phase of a second gate auxiliary signal AUX_G2 is required, the auxiliary signal generating circuit 150 may lag a phase of a touch driving signal VCOM and use the touch driving signal VCOM as the second gate auxiliary signal AUX_G2.

The auxiliary signal generating circuit 150 may use a clock CLK for generating a gate auxiliary signal AUX_G corrected in its phase. For example, the auxiliary signal generating circuit 150 may make a phase lead or lag in conformity with various timings based on edges of the clock CLK. The auxiliary signal generating circuit 150 may generate a clock CLK by itself, but also receive a clock CLK from another circuit, for example, the timing controller 160.

The auxiliary signal generating circuit 150 may generate a data auxiliary signal AUX_D or receive a data auxiliary signal AUX_D from another circuit. Hereinafter, a case when the auxiliary signal generating circuit 150 generates a data auxiliary signal AUX_D will be described.

The auxiliary signal generating circuit 150 may transmit the data auxiliary signal AUX_D to the data driving circuit 120. The data auxiliary signal AUX_D may comprise a series of data auxiliary signals AUX_D1, AUX_D2, ~AUX_Dn respectively corresponding to a plurality of data lines. The data driving circuit 120 may transmit each of the series of data auxiliary signals AUX_D1, AUX_D2, ~AUX_Dn through each data line to each pixel in the panel 110.

The auxiliary signal generating circuit 150 may measure a distortion of the data auxiliary signal AUX_D in the panel 110 and correct the distortion such that the data auxiliary signal AUX_D is identical to the touch driving signal VCOM.

Specifically, there may be a plurality of data lines, including a first data line and a second data line. The auxiliary signal generating circuit 150 may separately measure a first distortion of a first data auxiliary signal AUX_D1 transmitted through the first data line and a second distortion of a second data auxiliary signal AUX_D2 transmitted through the second data line. The auxiliary signal generating circuit 150 may correct the first distortion and the second distortion such that the first data auxiliary signal AUX_D1 and the second data auxiliary signal AUX_D2 are identical to the touch driving signal VCOM.

For example, the auxiliary signal generating circuit 150 may measure distortions of a phase or an amplitude of the first data auxiliary signal AUX_D1 supplied to a first pixel through the first data line. In a case when an amplitude of the first data auxiliary signal AUX_D1 decreases, the auxiliary signal generating circuit 150 may correct the first data auxiliary signal AUX_D1 so that the amplitude of the first data auxiliary signal AUX_D1 may increase by a size of the decrease of the amplitude. The auxiliary signal generating circuit 150 may transmit the first data auxiliary signal AUX_D1 having a corrected amplitude to the data driving circuit 120 and the data driving circuit 120 may supply the first data auxiliary signal AUX_D1 to the first pixel.

The auxiliary signal generating circuit 150 may also measure distortions of a phase or an amplitude of the second data auxiliary signal AUX_D2 supplied to a second pixel through the second data line. In a case when a phase of the second data auxiliary signal AUX_D2 leads, the auxiliary signal generating circuit 150 may correct the second data auxiliary signal AUX_D2 so that the phase of the second data auxiliary signal AUX_D2 may lag by an amount of time that the phase leads. The auxiliary signal generating circuit 150 may transmit the second data auxiliary signal AUX_D2 having a corrected phase to the data driving circuit 120 and the data driving circuit 120 may supply the second data auxiliary signal AUX_D2 to the second pixel.

In this case, a situation where the first data auxiliary signal AUX_D1 and the second data auxiliary signal AUX_D2 have different distortions and thus different corrections are performed, is described. However, the present disclosure is not limited thereto. It is possible to apply the same correction to the first data auxiliary signal AUX_D1 and the second data auxiliary signal AUX_D2. In the above-described example, the correction to the amplitude is applied to the first data auxiliary signal AUX_D1 and the correction to the phase is applied to the second data auxiliary signal AUX_D2. However, it is possible to apply a same correction to both the first data auxiliary signal AUX_D1 and the second data auxiliary signal AUX_D2. Specifically, in a case when the first distortion of the first data auxiliary signal AUX_D1 and the second distortion of the second data auxiliary signal AUX_D2 are different, it is possible to perform corrections based on any one of the distortions of the first data auxiliary signal AUX_D1 and the second data auxiliary signal AUX_D2. By expanding this concept, it is also possible to apply a same correction based on one distortion to a series of data auxiliary signals AUX_D1, AUX_D2, ~AUX_Dn.

Furthermore, it is also possible to apply a same correction to some of a series of data auxiliary signals AUX_D1, AUX_D2, ~AUX_Dn. In other words, a series of data auxiliary signals AUX_D1, AUX_D2, ~AUX_Dn may be divided into a plurality of groups and a same correction may be applied to data auxiliary signals belonging to a group. For example, a series of data auxiliary signals AUX_D1, AUX_D2, ~AUX_Dn may be divided into a first group and a second group. A same correction in a first method may be applied to data auxiliary signals in the first group and another same correction in a second method may be applied to data auxiliary signals in the second group. The data auxiliary signals in each group corrected in each method may be transmitted to the panel together with a touch driving signal.

The auxiliary signal generating circuit 150 may use a touch driving signal VCOM for generating a data auxiliary signal AUX_D. The reason is that a data auxiliary signal AUX_D needs to have the same characteristics, that is, the same phase and the same amplitude as those of a touch driving signal VCOM in principle. The auxiliary signal generating circuit 150 may receive a touch driving signal VCOM from the touch sensing circuit 140 and generate a data auxiliary signal AUX_D by reflecting distortions of the data auxiliary signal AUX_D measured in the panel 110 in the touch driving signal VCOM.

For example, in a case when a correction to increase a decreased amplitude of a first data auxiliary signal AUX_D1 is required, the auxiliary signal generating circuit 150 may increase an amplitude of a touch driving signal VCOM and use the touch driving signal VCOM as the first data auxiliary signal AUX_D1. Otherwise, in a case when a correction to lag a leading phase of a second data auxiliary signal AUX_D2 is required, the auxiliary signal generating circuit 150 may lag a phase a touch driving signal VCOM and use the touch driving signal VCOM as the second data auxiliary signal AUX_D2.

The auxiliary signal generating circuit 150 may use a clock CLK for generating a data auxiliary signal AUX_D. For example, the auxiliary signal generating circuit 150 may make a phase lead or lag in conformity with various timings based on edges of the clock CLK. The auxiliary signal generating circuit 150 may generate a clock CLK by itself, but also receive a clock CLK from another circuit, for example, the timing controller 160.

Here, the distortions of the gate auxiliary signals AUX_G1, AUX_G2, ~AUX_Gn may have characteristics different from each other. In other words, there may be a case when a first gate auxiliary signal AUX_G1 and a second gate auxiliary signal AUX_G2 have phases lagging by the same amount of time and amplitudes decreasing by the same amount. However, there may also be a case when the first gate auxiliary signal AUX_G1 has a distortion in which its phase lags, whereas the second gate auxiliary signal AUX_G2 has a distortion in which its amplitude decreases. In addition, the distortions of the data auxiliary signals AUX_D1, AUX_D2, ~AUX_Dn may also have characteristics different from each other. In other words, there may be a case when a first data auxiliary signal AUX_D1 and a second data auxiliary signal AUX_D2 have phases lagging by the same amount of time and amplitudes decreasing by the same amount. However, there may be a case when the first data auxiliary signal AUX_D1 has a distortion in which its phase lags, whereas the second data auxiliary signal AUX_D2 has a distortion in which its amplitude decreases.

In addition, a gate auxiliary signal AUX_GL AUX_G2, ~AUX_Gn and a data auxiliary signal AUX_D1, AUX_D2, ~AUX_Dn may have a same distortion or different distortions. There may be a case when the first gate auxiliary signal AUX_G1 and the first data auxiliary signal AUX_D1 may respectively have phases lagging by the same amount of time and amplitudes decreasing by the same amount. On the contrary, there may also be a case when the first gate auxiliary signal AUX_G1 has a distortion in which its phase lags, whereas the first data auxiliary signal AUX_D1 has a distortion in which its amplitude decreases.

Meanwhile, when the touch sensing circuit 140 drives a plurality of touch electrodes TE forming a touch electrode line (touch electrodes in shade), the gate driving circuit 130 may transmit the gate auxiliary signals AUX_G1, AUX_G2, ~AUX_Dn respectively to all the plurality of gate lines. The gate driving circuit 130 may transmit the gate auxiliary signals AUX_GL AUX_G2, ~AUX_Gn, of which the distortions in transmission are corrected, to the panel 110 in a touch time section. The gate auxiliary signals AUX_G1, AUX_G2, ~AUX_Gn together with the data auxiliary signals AUX_D1, AUX_D2, ~AUX_Dn may prevent the influence of parasitic capacitances on touch sensing.

In the same way, when the touch sensing circuit 140 drives a plurality of touch electrodes TE forming a touch electrode line (touch electrode in shade), the data driving circuit 120 may transmit the data auxiliary signals AUX_D1, AUX_D2, ~AUX_Dn respectively to all the plurality of data lines. The data driving circuit 120 may transmit the data auxiliary signals AUX_D1, AUX_D2, ~AUX_Dn, of which the distortions in transmission are corrected, to the panel 110 in a touch time section. The data auxiliary signals AUX_D1, AUX_D2, ~AUX_Dn together with the gate auxiliary signals AUX_G1, AUX_G2, ~AUX_Gn may prevent the influence of parasitic capacitances on touch sensing.

Figure 7:
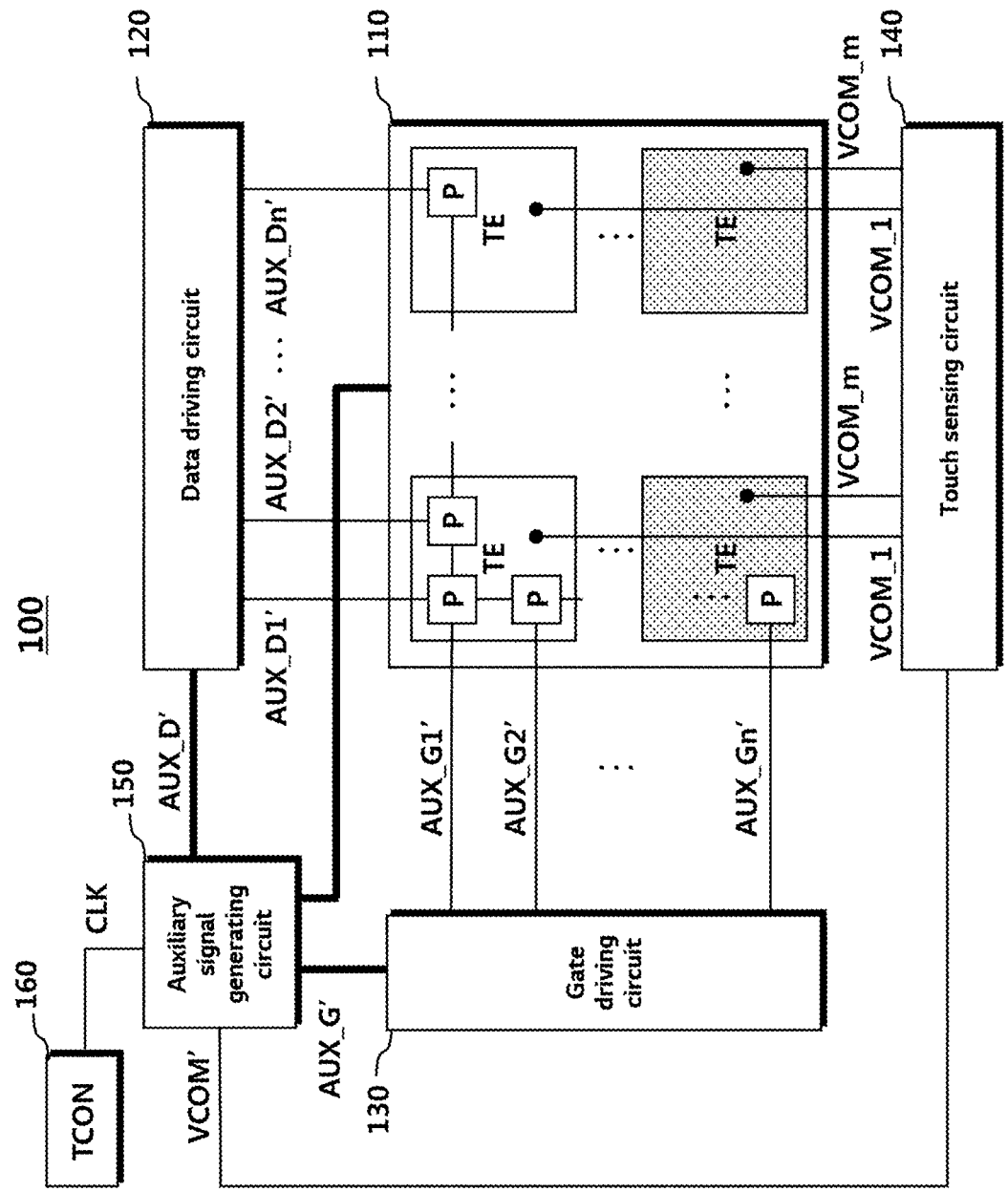
FIG. 7 is another example of a display device in which auxiliary signals are supplied to a panel according to an embodiment.

FIG. 7 is another example of a display device in which auxiliary signals are supplied to a panel according to an embodiment.

Referring to FIG. 7, the touch sensing circuit 140 may drive the plurality of touch electrodes TE using different signals. For example, the touch sensing circuit 140 may drive a first touch electrode using a first touch driving signal VCOM_1 and subsequently, using a $m^{th}$ touch driving signal VCOM_m (m is a natural number equal to or higher than 2) different from the first touch driving signal VCOM_1 in its frequency or amplitude. Otherwise, the touch sensing circuit 140 may drive the first touch electrode using the first touch driving signal VCOM_1, and subsequently, drive an $m^{th}$ touch electrode using the $m^{th}$ touch driving signal VCOM_m.

In this case, the auxiliary signal generating circuit 150 may generate a data auxiliary signal AUX_D or a gate auxiliary signal AUX_G in accordance with a touch driving signal that a touch electrode receives at the moment. For example, in a case when the touch sensing circuit 140 drives the first touch electrode using the first touch driving signal VCOM_1, and subsequently, drives the $m^{th}$ touch electrode using the $m^{th}$ touch driving signal VCOM_m, the auxiliary signal generating circuit 150 may generate an auxiliary signal using the $m^{th}$ touch driving signal VCOM_m, not using the first touch driving signal VCOM_1. When using the first touch driving signal VCOM_1, the auxiliary signal generating circuit 150 may generate a gate auxiliary signal AUX_G (in FIG. 6) and a data auxiliary signal AUX_D (in FIG. 6), whereas the auxiliary signal generating circuit 150 may generate a gate auxiliary signal AUX_G' and a data auxiliary signal AUX_D' when using the $m^{th}$ touch driving signal VCOM_m.

Specifically, the auxiliary signal generating circuit 150 may correct the gate auxiliary signal AUX_G' and the data auxiliary signal AUX_D' such that the gate auxiliary signal AUX_G' and the data auxiliary signal AUX_D' have the same characteristics as those of the $m^{th}$ touch driving signal VCOM_m. The auxiliary signal generating circuit 150 may receive the $m^{th}$ touch driving signal VCOM_m, change the phase and/or the amplitude of the $m^{th}$ touch driving signal VCOM-m, and transmit a changed $m^{th}$ touch driving signal VCOM_m to the gate driving circuit 130 as the gate auxiliary signal AUX_G'. In addition, the auxiliary signal generating circuit 150 may receive the $m^{th}$ touch driving signal VCOM_m, change the phase and/or the amplitude of the $m^{th}$ touch driving signal VCOM_m, and transmit a changed $m^{th}$ touch driving signal VCOM_m to the data driving circuit 120 as the data auxiliary signal AUX_D'.

Figure 8:
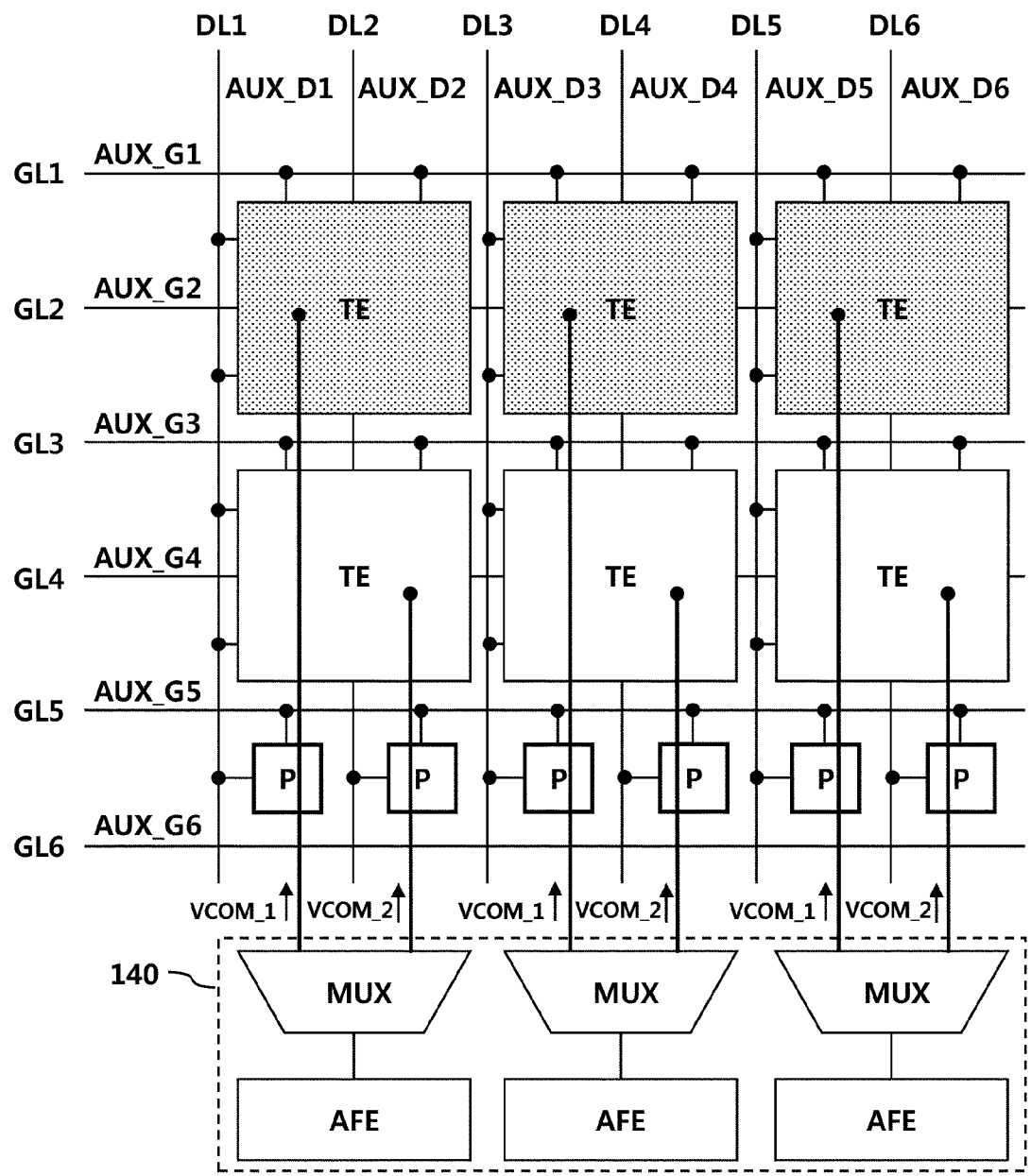
FIG. 8 is a diagram illustrating touch driving signals different depending on the distance between a touch electrode and a touch sensing circuit.

FIG. 8 is a diagram illustrating that touch driving signals are different depending on the distance between a touch electrode and a touch sensing circuit.

Referring to FIG. 8, a plurality of touch electrodes comprised in the touch panel may form touch electrode lines. FIG. 8 shows a first touch electrode line formed from a plurality of touch electrodes TE farthest from the touch sensing circuit 140 and a second touch electrode line closer to the touch sensing circuit 140 than the first touch electrode line. The first touch electrode line (in shade) may be in the process of being driven by a touch driving signal at the moment. The touch sensing circuit 140 may select either a first touch electrode in the first touch electrode line or a second touch electrode in the second touch electrode line using a multiplexer (MUX). Subsequently, the touch sensing circuit 140 may determine a touch or proximity of an external object using data of a change in capacitance received by an analog-front-end circuit from each touch electrode.

The touch sensing circuit may generally drive touch electrodes TE by a touch electrode line. The touch sensing circuit 140 may first drive the first touch electrode line farthest from the touch sensing circuit 140 and last drive the second touch electrode line closest thereto. Here, the touch sensing circuit 140 may drive the first touch electrode line farthest therefrom by a first touch driving signal VCOM_1 and the second touch electrode line closer thereto than the first touch electrode line by a second touch driving signal VCOM_2.

However, even though the first touch driving signal VCOM_1 and the second touch driving signal VCOM_2 are generated to have the same characteristics, they may have different characteristics in the panel. Specifically, since a distance to the first touch electrode in which the first driving signal VCOM_1 is transmitted is longer than a distance to the second touch electrode in which the second touch driving signal VCOM_2 is transmitted, a distortion of the first driving signal VCOM_1 may be relatively remarkable. For example, the first touch driving signal VCOM_1 may have a greatly decreased intensity so as to have an amplitude narrower than that of the second touch driving signal VCOM_2. Otherwise, a delay time in phase of the first touch driving signal VCOM_1 may be longer than a delay time in phase of the second touch driving signal VCOM_2.

The auxiliary signal generating circuit may correct auxiliary signals regarding gate lines and auxiliary signals regarding data lines such that they are identical to touch driving signals different depending on distances to touch electrodes TE.

For example, the auxiliary signal generating circuit may measure in the panel distortions of gate auxiliary signals AUX-G1, AUX_G2, ~AUX_G6 and data auxiliary signal AUX_D1, AUX_D2, ~AUX_D6 by comparing them with the first touch driving signal VCOM_1 for driving the first touch electrode (in shade) farthest from the touch sensing circuit and correct the distortions. The auxiliary signal generating circuit may supply corrected gate auxiliary signals AUX_G1, AUX_G2, ~AUX_G6 through a first gate line to a sixth gate line GL1, GL2, ~GL6 to the panel together with the first touch driving signal VCOM_1. The auxiliary signal generating circuit may also supply corrected data auxiliary signals AUX_D1, AUX_D2, ~AUX_D6 through a first to a sixth data lines DL1, DL2, ~DL6 to the panel together with the first touch driving signal VCOM_1.

In addition, the auxiliary signal generating circuit may measure in the panel distortions of the gate auxiliary signals AUX-G1, AUX_G2, ~AUX_G6 and the data auxiliary signal AUX_D1, AUX_D2, ~AUX_D6 by comparing them with the second touch driving signal VCOM_2 for driving the second touch electrode closer to the touch sensing circuit than the first touch electrode and correct the distortions. The auxiliary signal generating circuit may supply corrected gate auxiliary signals AUX_G1, AUX_G2, ~AUX_G6 through the first to the sixth gate lines GL1, GL2, ~GL6 to the panel together with the second touch driving signal VCOM_2. The auxiliary signal generating circuit may also supply corrected data auxiliary signals AUX_D1, AUX_D2, AUX_D6 through the first to the sixth data lines DL1, DL2, ~DL6 to the panel together with the second touch driving signal VCOM_2.

Here, since the first touch electrode is located farther from the touch sensing circuit than the second touch electrode, the first touch driving signal VCOM_1 may have a narrower amplitude and a longer phase delay than those of the second touch driving signal VCOM_2. That is, the first touch driving signal VCOM_1 may have distortions greater than those of the second touch driving signal VCOM_2. The auxiliary signal generating circuit may correct the gate auxiliary signals AUX_G1, AUX_G2, ~AUX_G6 and the data auxiliary signals AUX_D1, AUX_D2, ~AUX_D6 such that they are identical to the first touch driving signal VCOM_1 or the second touch driving signal VCOM_1 in the panel. Accordingly, the gate auxiliary signals AUX_G1, AUX_G2, ~AUX_G6 supplied when the first touch electrode is driven may be corrected in their amplitudes and phases by relatively greater amounts in comparison with the gate auxiliary signals AUX_G1, AUX_G2, ~AUX_G6 supplied when the second touch electrode is driven. For example, with regard to the first touch electrode, the gate auxiliary signal AUX_G1, AUX_G2, ~AUX_G6 may be corrected such that they have amplitudes greater than those that they have with regard to the second touch electrode. The data auxiliary signals AUX_D1, AUX_D2, ~AUX_D6 supplied when the first touch electrode is driven may be corrected in their amplitudes and phases by relatively greater amounts in comparison with the data auxiliary signals AUX_D1, AUX_D2, ~AUX_D6 supplied when the second touch electrode is driven.

What is claimed is:

1. A display driving device comprising:
   a gate driving circuit to transmit to a gate line a gate auxiliary signal having a first phase difference in comparison with a touch driving signal transmitted to a touch electrode; and
   a data driving circuit to transmit to a data line a data auxiliary signal having a second phase difference in comparison with the touch driving signal,
   wherein a phase difference between the touch driving signal and the gate auxiliary signal is less than the first phase difference in a region where the gate line and the touch electrode overlap and a phase difference between the touch driving signal and the data auxiliary signal is less than the second phase difference in a region where the data line and the touch electrode overlap, and
   wherein a phase of a first data auxiliary signal from among the data auxiliary signal is different from a phase of a second data auxiliary signal from among the data auxiliary signal.

2. The display driving device of claim 1, wherein a phase of the gate auxiliary signal is corrected according to the phase difference between the touch driving signal and the gate auxiliary signal in the region where the gate line and the touch electrode overlap.

3. The display driving device of claim 1, wherein the phase difference between the touch driving signal and the gate auxiliary signal is less than the first phase difference in the region where the gate line and the touch electrode overlap due to a resistance and capacitance (RC) delay in the gate line or the phase difference between the touch driving signal and the data auxiliary signal is less than the second phase difference in the region where the data line and the touch electrode overlap due to a resistance and capacitance (RC) delay in the data line.

4. The display driving device of claim 1, wherein the gate auxiliary signal and the data auxiliary signal have different phases.

5. The display driving device of claim 1, wherein touch electrodes are disposed in a horizontal direction in a panel to form a touch electrode line and a plurality of such touch electrode lines are disposed in the panel and the gate driving circuit transmits gate auxiliary signals to all of a plurality of gate lines when the touch sensing circuit drives one touch electrode line.

6. The display driving device of claim 1, wherein touch electrodes are disposed in a horizontal direction in a panel to form a touch electrode line and a plurality of such touch electrode lines are disposed in the panel and the data driving circuit transmits data auxiliary signals to all of a plurality of data lines when the touch sensing circuit drives one touch electrode line.

7. A display driving device comprising:
   a gate driving circuit to transmit a gate auxiliary signal to a gate line; and
   an auxiliary signal generating circuit to correct a phase of the gate auxiliary signal such that a phase difference between a touch driving signal transmitted to a touch electrode and the gate auxiliary signal decreases in a region where the gate line and the touch electrode overlap, and
   wherein a phase of a first gate auxiliary signal from among the gate auxiliary signal is different from a phase of a second gate auxiliary signal from among the gate auxiliary signal.

8. The display driving device of claim 7, wherein the auxiliary signal generating circuit receives the touch driving signal and generates the gate auxiliary signal by reflecting the phase difference between the touch driving signal and the gate auxiliary signal.

9. The display driving device of claim 8, wherein the auxiliary signal generating circuit generates the gate auxiliary signal by changing an amplitude or a phase of the touch driving signal.

10. The display driving device of claim 9, wherein the auxiliary signal generating circuit receives a clock from a timing controller and generates the gate auxiliary signal by changing the phase of the touch driving signal using the clock.

11. The display driving device of claim 7, wherein, when a touch sensing circuit drives a first touch electrode by a first touch driving signal and a second touch electrode by a second touch driving signal, the auxiliary signal generating circuit generates the first gate auxiliary signal in accordance with the first touch driving signal and generates the second gate auxiliary signal in accordance with the second touch driving signal.

12. The display driving device of claim 11, wherein the second touch electrode is located closer to the touch sensing circuit than the first touch electrode.

13. A display driving device comprising:
- a data driving circuit to transmit a data auxiliary signal to a data line; and
- an auxiliary signal generating circuit to correct a phase of the data auxiliary signal such that a phase difference between a touch driving signal transmitted to a touch electrode and the data auxiliary signal decreases in a region where the data line and the touch electrode overlap each other,
- wherein a phase of a first data auxiliary signal from among the data auxiliary signal is different from a phase of a second data auxiliary signal from among the data auxiliary signal.

14. The display driving device of claim 13, wherein the auxiliary signal generating circuit generates the data auxiliary signal by changing a phase or an amplitude of the touch driving signal.

15. The display driving device of claim 14, wherein the auxiliary signal generating circuit receives a clock from a timing controller and generates the data auxiliary signal by changing the phase of the touch driving signal using the clock.

* * * * *